July 28, 1942.                G. L. WALKER                2,291,065
                         STARTING ROD FEED DEVICE
                           Filed May 4, 1939
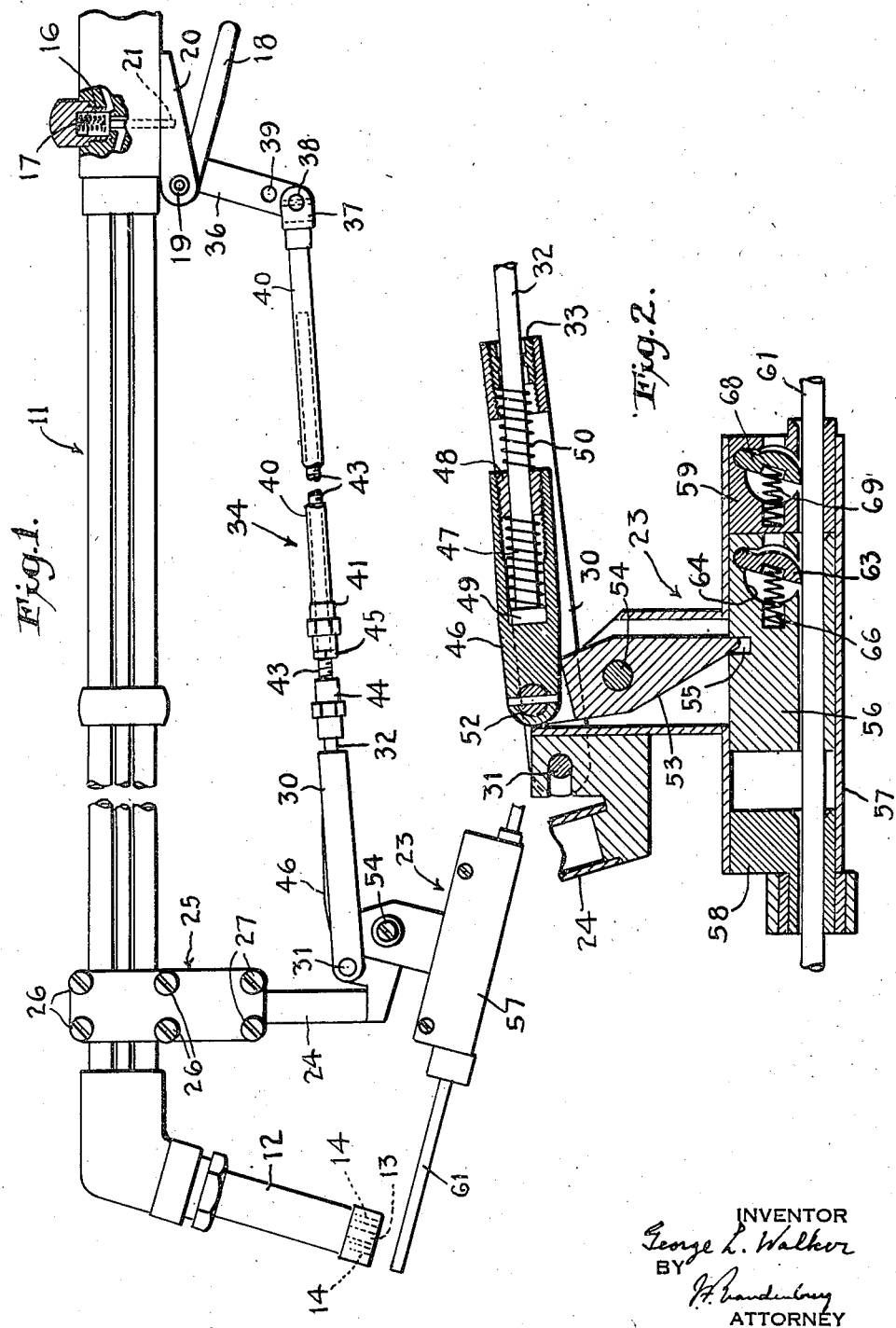
INVENTOR
George L. Walker
BY
J. F. Vandenburg
ATTORNEY Patented July 28, 1942

2,291,065

UNITED STATES PATENT OFFICE 2,291,065

STARTING ROD FEED DEVICE

George L. Walker, Jersey City, N. J., assignor to Air Reduction Company, Incorporated, New York, N. Y., a corporation of New York Application May 4, 1939, Serial No. 271,621

2 Claims. (Cl. 266—23)

This invention relates to starting rod feed devices such as used with oxygen cutting torches to effect quicker starting when de-seaming, billet gouging, scarfing, flame machining, or performing similar operations.

It is an object of the invention to provide an improved starting rod feed device, and more especially to improve the feed device disclosed in my patent No. 2,158,489, dated May 16, 1939, reissued December 30, 1941, No. 21,991.

One feature of this invention relates to simplified link mechanism by which the feeding apparatus is actuated, and another feature relates to the structure for holding the starting rod against retrograde movement. The friction encountered in feeding the rod forward is reduced substantially. This has the advantage not only of making the device easier to operate, but it greatly decreases the wear on the feeding apparatus and prolongs its service.

Other objects, features and advantages of the invention will appear or be pointed out as the specification proceeds.

In the accompanying drawing, forming a part hereof:

Fig. 1 is a fragmentary view of a cutting torch equipped with a starting rod feed device embodying this invention.

Fig. 2 is an enlarged sectional view of a portion of the feed device shown in Fig. 1.

A torch 11 has a tip 12 in which is a central cutting jet orifice 13 and a plurality of preheating jet orifices 14. The supply of oxygen to the central orifice is controlled by a quick-acting shut-off valve 16. A spring 17 urges the valve 16 into closed position.

A handle or lever 18 is connected with the torch by a pivot 19 that extends through one end of the lever and through a bifurcated bracket 20 fastened to the side of the torch. Counterclockwise angular movement of the lever 18 causes it to displace a valve stem 21 and open the valve 16 against the pressure of the spring 17.

The rod feed device 23 has a stem 24 that fits into a clamping member 25. The stem can be moved up and down in the clamping member 25 when the feed device must be adjusted for another length of tip. This same clamping member 25 that grips the stem 24 fits around the torch and grips the torch securely when clamping screws 26 are tight. Screws 27 at the lower end of the clamp 25 cause it to grip the stem 24.

A bifurcated link 30 is connected with the housing of the feed device by a pin 31. A rod 32 extends loosely through a bushing 33 in one end of the link 30. This rod 32 is a part of a composite tension member 34 by which the feed device is operated from an arm 36 attached to the lever 18 and forming with this lever a bell-crank.

The tension member 34 has a yoke 37 connected to the arm 36 by a pin 38 which can be inserted in different holes 39 in the arm 36 to change the leverage of the arm and thereby change the stroke of the feed device. The yoke 37 is soldered to one end of a sleeve or tube 40, and there is a coupling 41 soldered to the other end of the tube 40.

A long screw 43 threads through the connector 41 and extends into the tube 40. A connecting section 44 is integrally connected with the rod 32 and screw 43. A hexagonal portion of the connecting section 44 can be turned with a wrench to cause the long screw 43 to move further into or out of the sleeve 40. This adjustment permits the length of the tension member 34 to be changed through a wide range to accommodate the apparatus to torches of various lengths. On a long torch most of the screw 43 is out of the tube 40 and on a short torch the screw 43 is screwed far into the tube 40 as shown in the drawing. The screw 43 can be locked in any adjusted position by a lock nut 45.

An end cap 46 fits over one end of the rod 32. A spring 47 within the cap 46 is compressed between a bushing 48, that threads into the cap, and a head 49 on the end of the rod 32. This spring urges the head on the end of the rod 32 against the end wall of the recess in cap 46. The rod 32 slides freely in the bushing 48 as a bearing.

A spring 50 is compressed between the end cap 46 and the bushing 33 in the end of link 30. This spring 50 normally holds the cap 46 in the forward position shown in the drawing, and restores the parts to starting position after each feeding operation.

A pivot 52 fastened to the end cap 46 extends through the bifurcated upper end of a lever 53 that oscillates about a fulcrum bearing 54 supported by the housing of the feed device. The lower end of the lever 53 extends into a recess 55 in the top of a block 56 that slides back and forth in a tubular bearing 57 in the lower portion of the frame or housing of the feed device 23.

At the forward or rearward ends of the bearing 57 there are rod guides 58 and 59, respectively. A starting rod 61 extends through the rod guides 58 and 59 and through the block 56. The starting rod 61 is enough smaller than the openings through the guides and block to slide freely.

A feeding pawl 63 is located in a transverse opening 64 in the reciprocating block 56. The pawl 63 is of generally segmental contour but has a lug at its upper end that fits into a complementary recess in the upper wall of the transverse opening 64. The total height of the pawl 63 is a little greater than the space above the rod 61 so that the pawl cannot move into contact with the back of the opening 64 or into a position in which the bottom tip of the pawl can come into vertical alignment with the lug at the top of the pawl. A spring 66 pushes the pawl 63 rearwardly to hold the pawl 63 against the rod 61.

Whenever the block 56 moves forward (toward the left in Fig. 2) the feeding pawl 63 tends to dig into the starting rod 61 and wedges or jams the rod against the bottom side of the opening through which the rod passes and makes the rod move forward with the block. On return movement of the block 56 the pawl 63 slides freely on the rod 61. The spring 66 is light and produces only very light friction of the pawl 63 on the rod. The block 56 and pawl 63 comprise a rod-feeding clutch.

A holding pawl 68, similar in construction to the feeding pawl 63, is located in a transverse opening in the rearward rod guide 59 and is held in contact with the rod 61 by a light spring 69. This holding pawl 68 offers only a very light frictional resistance to forward movement of the rod 61, but tends to dig into the rod and wedges or jams the rod against the wall of the guide 59 when the rod 61 starts to move rearward. The guide 59 and pawl 68 are therefore a stationary or holding clutch for preventing retrograde movement of the rod.

The operation of the rod-feeding device is as follows:

When a cutting operation is to be started, the torch operator first moves the handle or lever 18 through a limited angle not sufficient to bring it against and displace the valve stem 21. The initial movement of the lever 18 pulls the tension member 36 and rocks the lever 53 clockwise so that the block 56 is pushed forward in its tubular bearing 57 and against the back of the forward rod guide 58 as a limit stop.

This forward movement of the block 56 feeds the end of the rod forward under the tip 12 where it is quickly heated by flames from the preheating jet orifices. As soon as the forward end of the starting rod is heated to a kindling temperature, the operator moves the lever 18 further and displaces the valve stem 21 to move the valve 16 into open position and permit the flow of cutting oxygen to the tip 12.

This final movement of the lever 18 pulls the tension member 34, but the lever 53 cannot rock any further because the block 56 is already against the forward rod guide 58. The motion is taken up by moving the head 49 on the end of the stem 36 toward the bushing 48, against the pressure of the spring 48. The connection of the stem 32 and end cap 46 is therefore a lost-motion connection, and the spring 47 prevents the lost motion from being effective until after the starting rod has been moved forward.

The spring 50 urges the end cap 46 to the left in Fig. 2 and thereby restores the reciprocating block 56 and the lever 18 to their original positions whenever the lever 18 is released.

Terms of orientation in the description and claims are relative. The structure illustrated can be changed or modified, and some features of the invention can be used without others.

I claim:

1. The combination in a starting rod feed device having a reciprocating member that advances a feed rod during the forward strokes of said member, a handle, and a motion-transmitting linkage between the handle and said reciprocating member, a cross-piece outside of the linkage through which one link of said linkage extends, an enlarged end on that link, and a spring surrounding said link and compressed between the cross-piece and the enlarged end to urge the linkage in a direction to move the handle and reciprocating member back to starting position after each feeding stroke.

2. Apparatus for feeding a starting rod into the flame of a gas cutting torch that has a valve-operating lever, said apparatus including in combination a rod-feeding clutch that moves forward and rearward, means for causing the rod-feeding clutch to move the rod during only the forward movement of the clutch, a linkage for transmitting motion to said rod-feeding clutch from the valve-operating lever of the torch, a lost-motion connection in said linkage, a spring associated with the linkage and urging the lost-motion connection to remain at one end of its movement until the clutch end of the linkage reaches its limit of travel, and a restoring spring pressing against one of the links of said linkage on the clutch side of said lost-motion connection.

GEORGE L. WALKER.